US009066253B2

(12) United States Patent
Schmidt et al.

(10) Patent No.: US 9,066,253 B2
(45) Date of Patent: Jun. 23, 2015

(54) SYSTEM AND METHOD FOR REDUCED INTERRUPTION TIME IN MOBILE COMMUNICATIONS

(75) Inventors: Andreas Schmidt, Braunschweig (DE); Hyung-Nam Choi, Hamburg (DE); Maik Bienas, Braunschweig (DE); Martin Hans, Bad Salzdetfurth (DE)

(73) Assignee: Intel Mobile Communications GMBH, Neubiberg (DE)

( * ) Notice: Subject to any disclaimer, the term of this patent is extended or adjusted under 35 U.S.C. 154(b) by 1423 days.

(21) Appl. No.: 12/207,906

(22) Filed: Sep. 10, 2008

(65) Prior Publication Data

US 2010/0062779 A1 Mar. 11, 2010

(51) Int. Cl.
*H04W 72/00* (2009.01)
*H04W 24/04* (2009.01)
(Continued)

(52) U.S. Cl.
CPC .............. *H04W 24/04* (2013.01); *H04W 36/08* (2013.01); *H04W 36/22* (2013.01)

(58) Field of Classification Search
CPC ..... H04W 72/042; H04W 74/08; H04W 8/26; H04W 72/12; H04W 36/00; H04W 52/0225; H04W 72/1289; H04W 74/04; H04W 74/0875; H04W 76/028; H04W 24/04; H04W 72/0413; H04W 72/085; H04W 56/0015; H04W 52/242; H04W 40/02; H04W 52/245; H04L 23/02; H04L 5/0037; H04L 5/0089; H04L 5/0096; H04L 41/0604; H04L 41/0631; H04J 3/06; H04J 11/005; H04J 11/0023; H04J 11/0093
USPC ................. 370/216, 217, 218, 219, 220, 221; 455/450
See application file for complete search history.

(56) References Cited

U.S. PATENT DOCUMENTS

| 5,953,662 A | 9/1999 | Lindquist et al. |
| 6,321,081 B1 | 11/2001 | Lee et al. |

(Continued)

FOREIGN PATENT DOCUMENTS

| CN | 1798418 A | 7/2006 |
| CN | 101009922 | 8/2007 |

(Continued)

OTHER PUBLICATIONS

3GPP TS 36.300 V8.5.0 (May 2008); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

(Continued)

*Primary Examiner* — Nimesh Patel
(74) *Attorney, Agent, or Firm* — Schwabe, Williamson & Wyatt, P.C.

(57) ABSTRACT

A method and mobile communication device that reduce communication interruption time when a base station stops operating are described. The mobile communication device is wirelessly connected to a cell operated by a base station. The method includes determining a fallback cell, obtaining parameters to quickly establish a wireless connection to the fallback cell, determining that the base station is stopping operation, and using the parameters to quickly establish a wireless connection to the fallback cell. Also described are a base station and method for the base station to reduce communication interruption time. The method includes determining that the base station is stopping operation, switching to a backup power source if the base station is stopping operation due to loss of power, and transmitting a message to the mobile communication devices connected to the base station that they should switch to a fallback cell, since the base station is stopping operation.

17 Claims, 10 Drawing Sheets

(51) Int. Cl.
*H04W 36/08* (2009.01)
*H04W 36/22* (2009.01)

(56) References Cited

U.S. PATENT DOCUMENTS

| | | | |
|---|---|---|---|
| 6,353,747 | B1 | 3/2002 | Honda et al. |
| 6,668,178 | B1 | 12/2003 | Ramaswamy et al. |
| 7,945,266 | B2* | 5/2011 | Chen et al. .................... 455/437 |
| 2002/0131378 | A1* | 9/2002 | Korinek et al. ............... 370/331 |
| 2006/0153151 | A1* | 7/2006 | Huang et al. .................. 370/338 |
| 2007/0190996 | A1 | 8/2007 | Asthana et al. |
| 2008/0194225 | A1* | 8/2008 | Tischer et al. ............. 455/404.2 |

FOREIGN PATENT DOCUMENTS

| | | |
|---|---|---|
| CN | 101043722 A | 9/2007 |
| CN | 101212807 A | 7/2008 |
| EP | 0 896 781 B1 | 1/2002 |
| WO | WO-01/58201 A1 | 8/2001 |
| WO | WO-02/47402 A2 | 6/2002 |
| WO | WO-2007/040453 A2 | 4/2007 |

OTHER PUBLICATIONS

3GPP TR 25.820 V1.0.0 (Nov. 2007); Technical Report; 3rd Generation Partnership Project; Technical Specification Group Radio Access Networks; 3G Home NodeB Study Item Technical Report (Release 8).

Jun. 5, 2013 Office Action for Chinese Patent Application No. 200980144681.6 (with English translation).

Chinese Patent Office; Third Office Action for Chinese Patent Application No. 200980144681.6, mailed Sep. 12, 2014; 30 pages, inclusive of English language translation.

* cited by examiner

SYSTEM AND METHOD FOR REDUCED INTERRUPTION TIME IN MOBILE COMMUNICATIONS

BACKGROUND OF THE INVENTION

"Node B" mobile communication network element is a base transceiver station that typically contains radio frequency transmitters and receivers used to communicate directly with mobile devices, such as mobile telephones, that move freely within a communication range of one or more such Node B base stations. A type of Node B base station, known as a "Home Node B" (HNB) may soon be added to many mobile communication networks. A "Home Node B" is a modified Node B, for use in buildings or home environments, in order to increase the in-building coverage of the network. A typical use for such a I-Home Node B may be, for example, in the home or apartment of a mobile phone user. The user would use a broadband (possibly wired) network connection, such as a conventional digital subscriber line (DSL) connection to connect a Home Node B to his operator's core network. This usage may be beneficial for both the user and the network operator, since the user may save money and battery power on his mobile phone due to improved coverage within his home or building, and the operator may receive additional network coverage.

A Home Node B should preferably be designed for flexibility. A Home Node B base station device should be easy to use and easy to set up. Additionally, for some applications, it may be desirable for a Home Node B device to be relatively small, so that it may be used nomadically. For example, a user may set up his Home Node B in his home one day, and in a hotel room in which he is staying for a business trip the next day. It is also possible that Home Node B base stations may be switched on or off by a user, who, for example, may want to switch the Home Node B base station off at night, or when he leaves his apartment. Additionally, because of the wide variety of network environments in which a Home Node B base station may operate, it is possible that the broadband connection that is used to connect the Home Node B to the network operator may have inconsistent connection quality, and/or inconsistent bandwidth.

SUMMARY OF THE INVENTION

Embodiments of the invention provide methods and mobile communication devices that reduce communication interruption time when a base station stops operating. The mobile communication device is wirelessly connected to a cell operated by a base station. The methods include determining a fallback cell, obtaining parameters to quickly establish a wireless connection to the fallback cell, determining that the base station is stopping operation, and using the parameters to quickly establish a wireless connection to the fallback cell.

Embodiments further provide a base station and methods for the base station to reduce communication interruption time. The methods include determining that the base station is stopping operation, switching to a backup power source if the base station is stopping operation due to loss of power, and transmitting a message to the mobile communication devices connected to the base station that they should switch to a fallback cell, since the base station is stopping operation.

These and other features of the invention will be better understood when taken in view of the following drawings and a detailed description.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION OF ILLUSTRATIVE EMBODIMENTS

As described above, a Home Node B (HNB) should be flexible in its operation. One difficulty with such flexibility is a reduction in the reliability of connections with the HNB. A conventional Node B base station runs essentially continuously, with high reliability, at a fixed location. Users of mobile communication systems have come to expect the reliability provided by a wireless network using such conventional Node B base stations. Specifically, users do not expect that a connection will be dropped during a call, when the connection quality was good immediately before the call was dropped. However, the flexibility desired in a Home Node B may lead to a reduction in reliability. For example, if the owner of a Home Node B decides to switch it off, any calls being handled by the Home Node B will be dropped, even if there was high connection quality immediately before the Home Node B was switched off.

There may be comparable reliability problems in conventional mobile communication networks when, for example, a mobile phone user enters a tunnel or other area without coverage during a call. In such a case, the radio link connection to the mobile phone may suddenly be dropped. In a conventional mobile communication system, this may be handled by maintaining the connection on the network on a Non Access Stratum (NAS) protocol level, such that the context of the communication session (an NAS context) is maintained for a limited amount of time, even though there is no data exchange between the mobile device (also referred to as a "User Equipment" or UE) and the network. During this time, the affected UE may search for a suitable cell, and may re-connect to the network if such a cell is found. Once the radio link is re-established, the session will be continued.

Unfortunately, under this conventional solution to the problem of dropped connections, the radio link will be interrupted for a period of time. The duration of the interruption depends on the time required by the UE to find a suitable new cell and to establish a radio link to this cell.

According to various embodiments of the invention, it is possible to avoid the problem of the connection to the network dropping or being interrupted for a substantial period of time when a connection to a Home Node B is lost (e.g., due to the HNB being switched off, affected by a power loss, or losing its connection to the core network—for example, if the owner of the HNB pulls out the DSL cable connected to the HNB). As detailed below, embodiments of the invention provide a mobile communication system with a fast re-establishment capability, that permits a radio link to be re-established after an HNB stops operation, before the context of the connection (e.g., the NAS context) is deleted due to expiration of a corresponding timer, and preferably without a substantial interruption in the connection.

Figure 1:
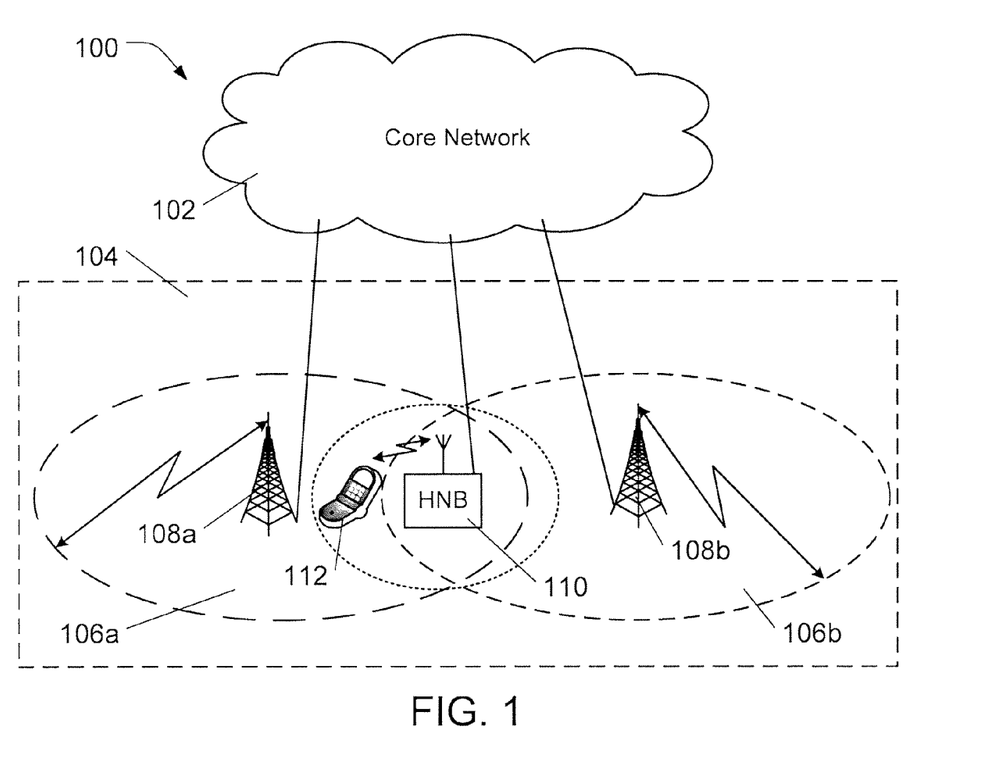
FIG. 1 shows an architectural overview of an example network architecture for use with embodiments of the invention.

Referring to FIG. 1, an architectural overview of an example network architecture for use with embodiments of the invention is shown. The network 100 includes a "core network" (CN) 102, and a radio network 104. The core network 102 is the central part of the network 100, is normally operated by a communication services provider, and includes both wired and wireless components that provide mobile communication services over large areas to many users. The radio network 104 connects individual users to the core network 102 in order to provide communication services, and includes both wireless and wired components, some of which may be operated by the communication services provider that operates the core network 102, and some of which may be operated by others.

The radio network 104 includes numerous macro cells, such as macro cells 106a and 106b, which are covered by regular Node B base stations 108a and 108b, respectively. Within the coverage of both Node B base stations 108a and 108b, a Home Node B (HNB) base station 110 is operated. A mobile communication device 112 (also referred to as a "user equipment" or UE), such as a mobile telephone, is in wireless communication with the HNB base station 110, for example during an ongoing call. The Node B base stations 108a and 108b, and the HNB base station 110 are connected to the core network 102.

The network architecture shown in FIG. 1 may be, for example, an evolved UMTS (universal Mobile Telecommunications System) radio network. Such a radio network may also be referred to as and LTE (Long Term Evolution) or E-UTRA (Evolved UMTS Terrestrial Radio Access) network. In some embodiments of such an architecture, OFDMA (Orthogonal Frequency-Division Multiple Access) may be used an a downlink multiple access scheme, and/or SC-FDMA (Single-Carrier Frequency-Division Multiple Access) may be used as an uplink multiple access scheme.

Figure 2A:
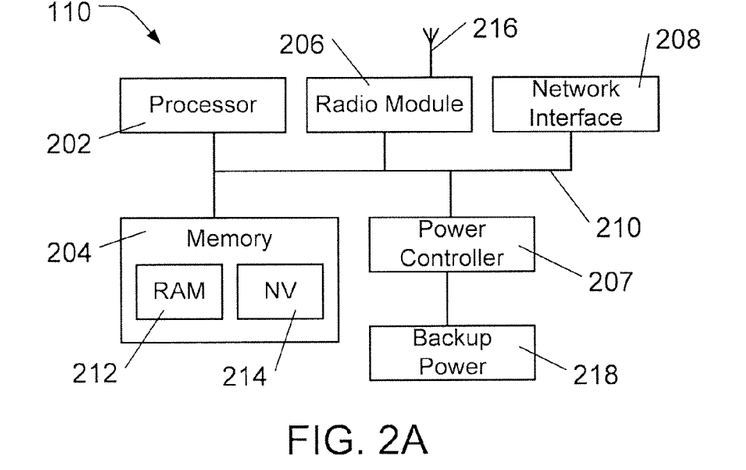
FIGS. 2A and 2B are block diagrams illustrating example architectures for a Home Node B base Station and a mobile communication device in accordance with an embodiment of the invention.

FIG. 2A shows a block diagram of an architecture for the HNB base station 110. The HNB base station 110 includes a processor 202, memory 204, a radio module 206, a power controller 207, and a network interface 208, connected by a bus 210. In some embodiments, the memory 204 may include random access memory 212, such as conventional DRAM, and non-volatile memory 214, such as conventional flash memory, for storing the firmware that operates the HNB base station 110, as well as other parameters and settings that should be retained by the HNB base station 110.

The radio module 206 may include an antenna 216, which is used for communication wirelessly with one or more mobile communication devices, such as mobile telephones. The network interface 208 connects the HNB base station 110 to the core network, and may be a conventional wired network interface, such as a DSL interface, an Ethernet interface, or a USB interface that connects to an external computer or network interface device for connection to the core network. Alternatively, the network interface 208 may be a wireless network interface, that communicates with the core network via a wireless local-area network, a wireless metropolitan area network or a wireless wide area network.

The HNB base station 110 may be housed in a compact, portable housing (not shown), and may be powered by a conventional home power connection (not shown), via the network interface 208 (e.g., power via a USB connection or power over Ethernet), or by other known methods of powering an electronic device. In some embodiments, the HNB base station 110 may include a backup power source 218, such as a battery (which may be a rechargeable battery) connected to the power controller 207, which may provide power for the HNB base station 110 to continue operation for a limited duration in the event of a power loss, such as may occur if the HNB base station 110 is unplugged or switched off.

It will be understood that the architecture shown in FIG. 2A is only one possible architecture for the HNB base station 110, and that there may be many variations or additions to the architecture. For example, the HNB base station 110 may include I/O devices, such as a display (not shown), a smart card interface and a smart card (not shown), to verify that the HNB is authorized for operation, or a variety of indicator lights or LEDs (not shown), to indicate the current status of the HNB base station 110.

Figure 2B:
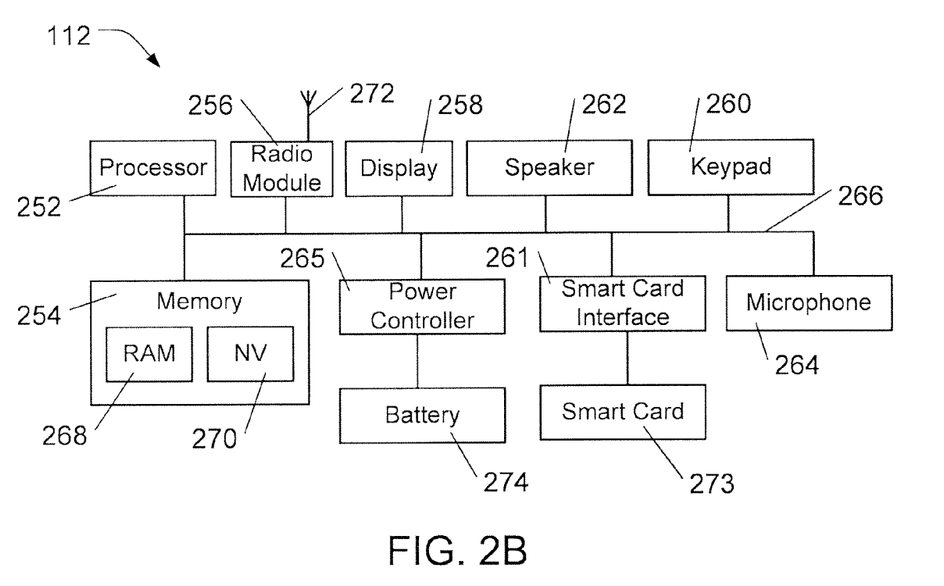

FIG. 2B shows a block diagram of an example architecture of the mobile communication device 112 (in this example, a mobile telephone), for use with embodiments of the invention. The mobile communication device 112 includes a processor 252, memory 254, a radio module 256, a display 258, a keypad 260, a smart card interface 261, a speaker 262, a microphone 264, and a power controller 265, all connected by a bus 266. In some embodiments, the memory 254 may include random access memory 268, such as conventional DRAM, and non-volatile memory 270, such as conventional flash memory, for storing the firmware that operates the mobile communication device 112, as well as other parameters and settings that should be retained by the mobile communication device 112. The radio module 256 may include an antenna 272, and may be used to communicate wirelessly with a Node B base station or HNB base station.

The smart card interface 261 may be used to connect a smart card 273 to the mobile communication device 112. Examples of such smart cards include SIM (Subscriber Identity Module) cards, UICC (Universal Integrated Circuit Card) smart cards with integrated SIM or USIM (Universal Subscriber Identity Module), or other types of smart cards.

The mobile communication device 112 may be housed in a compact portable housing (not shown). For purposes of mobility, the mobile communication device 112 would typically be powered by a battery 274 connected to the power controller 265.

It will be understood that the architecture shown in FIG. 2B is only one possible architecture for a mobile communication device 112, and that there may be many variations or additions to the architecture. For example, the speaker 262 and microphone 264 may be part of a more complex sound module, the display 258 may be a touch-screen, obviating the need for the keypad 260, and/or additional I/O devices, such as a wireless personal area network interface (e.g., a BLUETOOTH wireless network interface) may be added to the mobile communication device 112.

Figure 3:
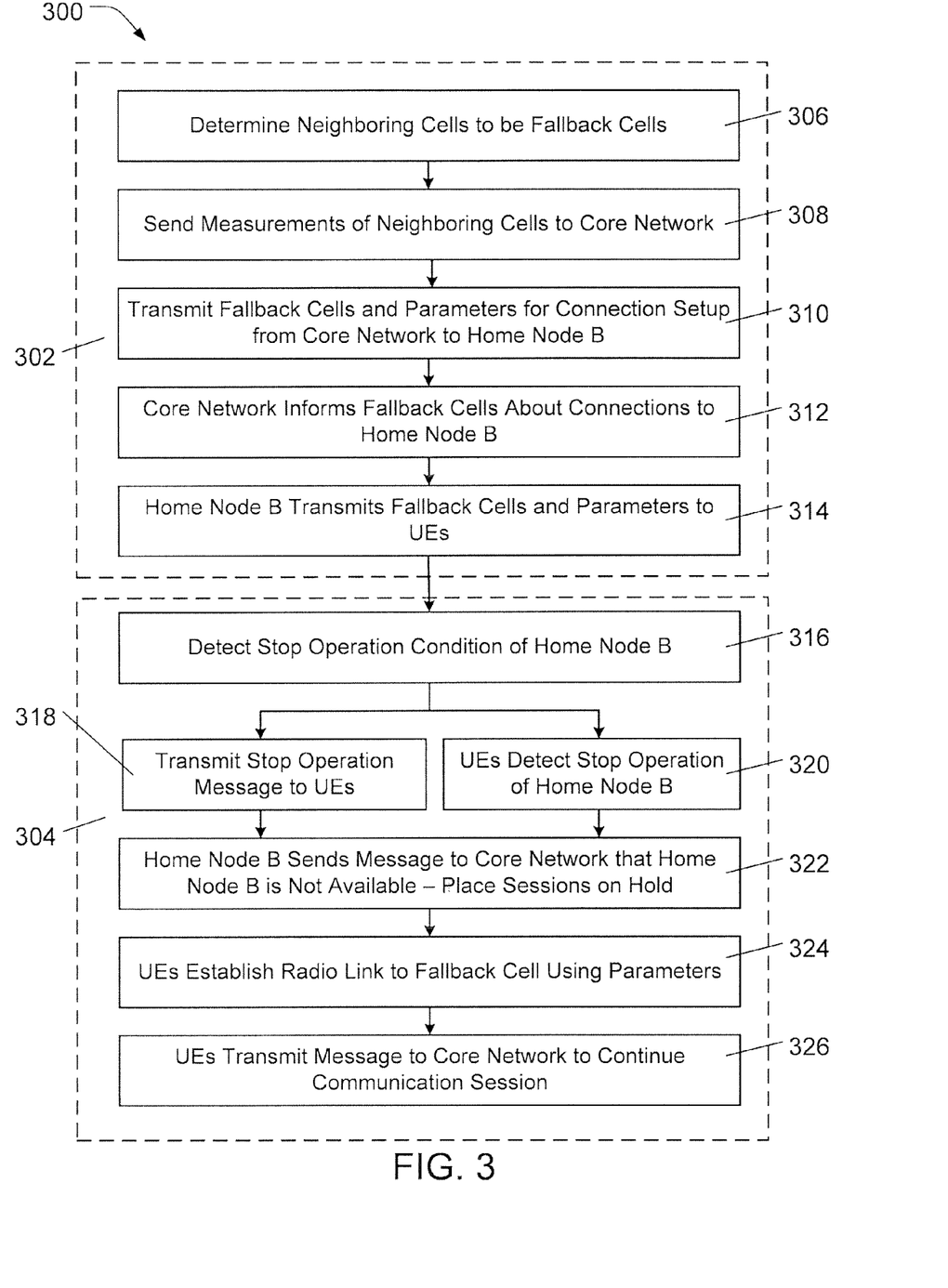
FIG. 3 is a flowchart of a process for reducing a connection interruption when a Home Node B base station that is maintaining communication with a mobile communication device becomes unavailable, in accordance with an embodiment of the invention.

FIG. 3 shows a flowchart of a process for reducing a connection interruption when a Home Node B base station that is maintaining communication with a mobile communication device becomes unavailable, in accordance with an example embodiment of the invention. The process 300 shown in FIG. 3 includes two major phases—a preparation phase 302, and an execution phase 304. The preparation phase 302 generally determines usable fallback cells and distributes relevant information on the fallback cells to various entities (e.g., the core network, UEs connected to the HNB). The execution phase 304 generally detects that an HNB has stopped operating, transmits relevant information to various entities, and establishes a radio link to a fallback cell.

During the preparation phase 302, prior to the end of operation of the HNB, at 306 one or several cells "neighboring" the HNB may be determined to be "fallback cells". These "fallback" cells may be covered by a regular Node 13, or by another HNB. Determining the fallback cells may be achieved by the UE that is using the HNB making measurements of the received signal power of neighboring cells. In some embodiments, these measurement results (i.e., the cell-IDs and corresponding received power levels of neighboring cells) may be transmitted by the UE to the HNB. Alternatively, in some embodiments, the HNB may itself perform direct measurements of the received signal power of any neighboring cells.

At 308 the HNB transmits the measurements to the core network (e.g., to a Mobility Management Entity [MME] of the core network, which is responsible for controlling the mobility of UEs located in the coverage area of the network), which will determine from the measurements one or more "best suited" fallback cells. At 310, the fallback cells and corresponding parameters needed by the UE to perform connection set-up with the fallback cells (e.g., codes and slot numbers for random access) may be transmitted by the core network to the HNB, which stores them. At 312, the core network (e.g., the MME) may inform the fallback cells about ongoing connections from HNBs, so that the fallback cells are prepared to continue the connection (e.g., they can reserve any necessary resources) in case the HNB ceases operation.

At 314, the cell-IDs of one or more fallback cells and the corresponding parameters needed for radio link setup may be transmitted to the UE or to all UEs that have a radio link to the HNB or that are "camping" on the HNB, i.e. UEs that are in the coverage area of this HNB and will be served by it, but have currently no radio link established. This may be done during the normal operation of the HNB. The UEs would store the parameters, and there would be no need to send the parameters after detecting a condition that would stop the operation of the HNB. Alternatively, the fallback cells and parameters can be sent after a stop of operation condition is detected by the HNB. In this case, the parameters may be used immediately for setting up a connection to a fallback cell. This late sending of the parameters permits the latest changes in the surrounding cells to be taken into consideration.

In the execution phase 304, at 316, a "stop operation" condition is detected on the HNB. At 318, this causes the HNB to transmit a message to all UEs in its coverage area, informing the UEs that they must immediately connect to a fallback cell. In some embodiments, this message may include the parameters of the fallback cells needed for connection setup. The HNB may transmit one message that is directed to all connected UEs, or it may transmit individual messages, with individual (and possibly different) parameters for fallback cells to each connected UE. The ability to continue to transmit messages after a condition that would stop operation of the HNB, such as loss of power or being turned off, may be facilitated by the presence of a battery in the HNB, which permits the HNB to continue transmitting messages for a period of time after loss of power or being turned off.

Alternatively, at 320, the UE detects on its own that the HNB has stopped operation. This may occur, e.g., when there has been no communication with the HNB for a predetermined period of time.

At 322, if possible (i.e., the HNB is still running—perhaps off of a battery, and is still connected to the core network), the HNB sends a message to the core network, to indicate that the HNB will no longer be available. This will prevent the core network from forwarding downlink data or paging messages to this HNB, and may prevent this HNB from being listed as fallback cell for any other nearby HNBs.

At 324, once the UE is aware of the end of operation of the HNB, either due to receiving a message from the HNB or by detecting on its own that the HNB is no longer operating, the UE attempts to establish a radio link to the fallback cell using parameters that were previously received.

Finally, at 326, when the UE establishes the radio link to the fallback cell, it transmits a message to the core network, leading to the continuation of the previous session.

Figure 4:
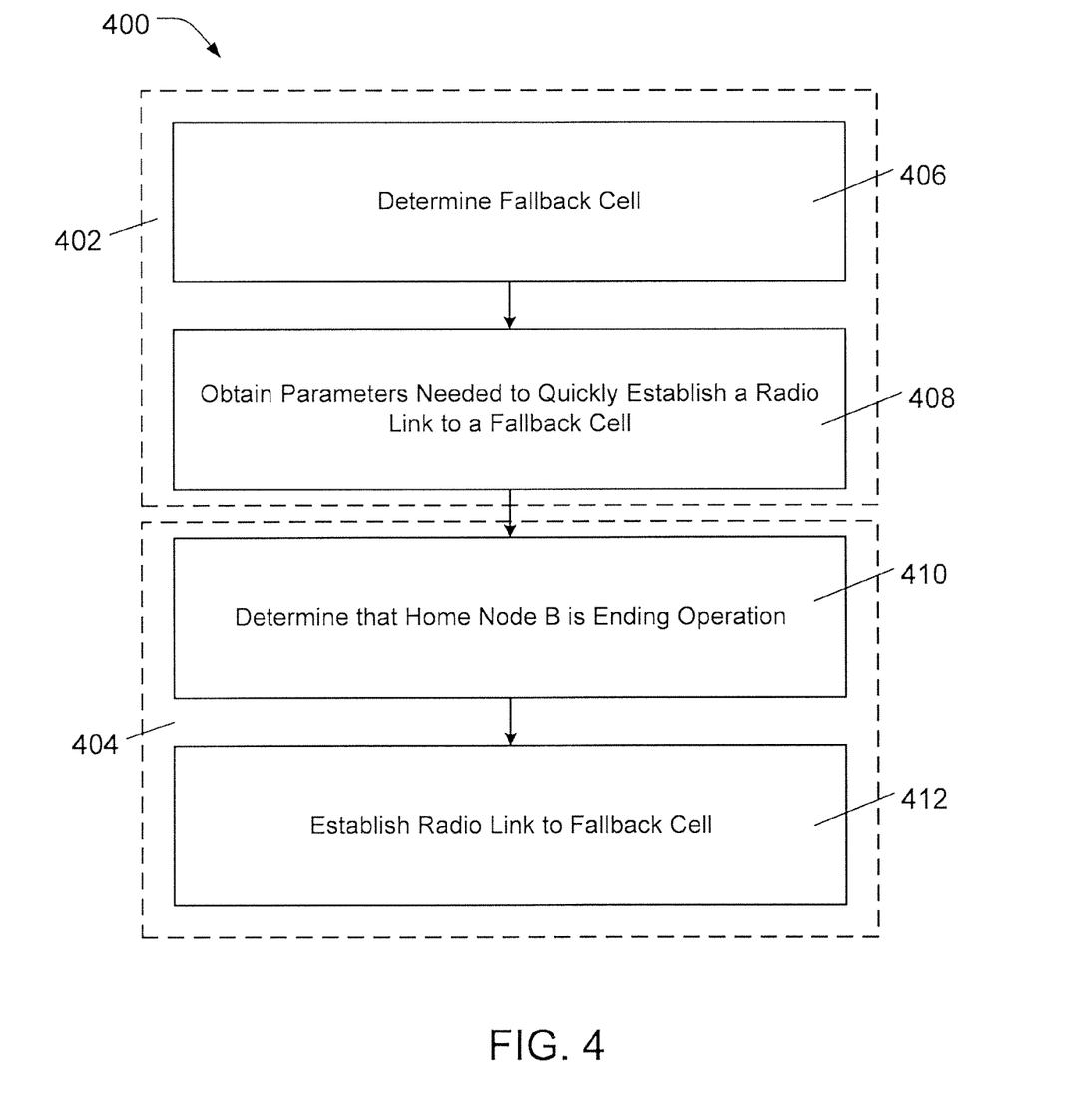
FIG. 4 shows a flowchart of a process to reduce the interruption time of an ongoing connection after a Home Node B stops operation in accordance with an embodiment of the invention.

FIG. 4, shows a more general flowchart of a process to reduce the interruption time of an ongoing connection after an HNB stops operation, without the need to for message exchange between the HNB and the macro cell, in accordance with an embodiment of the invention. As before, the process 400 includes a preparation phase 402, and an execution phase 404.

In the preparation phase 402, at 406, one or several fallback cells are determined by the UE and/or the HNB and/or the core network. The fallback cell is used by the UE to continue a connection after disruption of HNB operation. The fallback cells may be macro cells operated by regular NodeBs, or cells operated by other HNBs.

At 408, the HNB obtains parameters that are needed to quickly establish a radio link to the fallback cell. Examples of such parameters may include a carrier frequency, a cell ID, and/or codes and resources for random access. Obtaining these parameters may be done before the HNB stops operation, or with the message that indicates that the HNB is stopping operation.

In the execution phase 404, at 410, a message is sent indicating the end of operation of the HNB. This message may be a broadcast to all connected UEs, or a dedicated message sent to each connected UE with individual parameters for a fallback cell. In some embodiments the end of operation of the HNB may be delayed for a period of time—long enough to send out such messages—with a battery or similar means.

At 412, this message triggers the UE to establish a radio link to another cell, such as one of the fallback cells.

There are numerous variations on the process 400. For example, one or more fallback cells may be dedicated to an HNB as its "fallback cells". These cells may be prepared to continue ongoing connections of the UEs that are connected via the HNB. These "fallback cells" are, therefore, informed about ongoing calls from their related HNBs.

As an additional variation, when stopping operation, the HNB may send a message to the core network, so that the core network is aware as soon as possible of the stopping of operation of the HNB. This will prevent the forwarding of downlink data or paging messages to the HNB that sent the message.

It should also be noted that UEs could also use the fallback cells in case the user leaves the coverage area of the HNB (e.g., the HNB covers a building, and the user leaves the building). This could provide reduced interruption times.

Figure 5A:
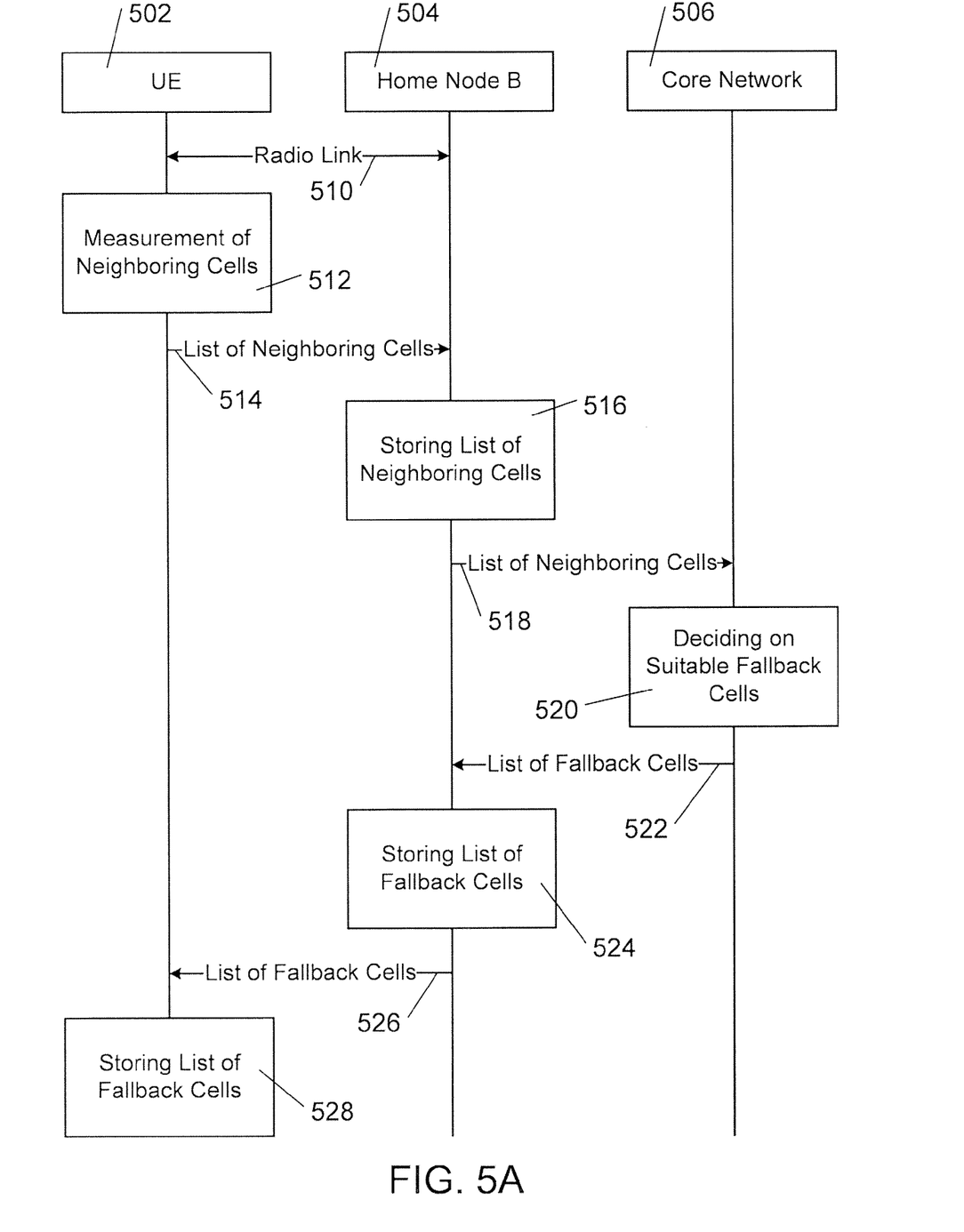
FIGS. 5A and 5B show, respectively, message sequence charts for a preparation phase and an execution phase of an embodiment in accordance with the invention.

Referring now to FIG. 5A, a message sequence chart is described for the preparation phase of an embodiment in accordance with the invention.

At 510, a UE 502 has established a radio link to an HNB 504. At 512, the UE 502 performs measurements of the neighboring cells. It measures the received power level and obtains the corresponding cell-ID of one or more adjoining or neighboring cells.

At 514, the UE 502 transmits a list with the cell-IDs and the received power levels to the HNB 504. The HNB 504 stores the list at 516, and at 518, the HNB 504 forwards the list to the core network 506.

At 520, the core network 506 decides, based on the received power levels and on further parameters (e.g., the load condition and capacity of the candidate cells), which of the cells are suitable as fallback cells. At 522 the core network 506 transmits a list with the cell-IDs of the suitable fallback cells to the HNB 504. This list includes relevant parameters that are needed by the UE 502 to establish a radio link to the fallback cells.

At 524, the HNB 504 stores the list received from the core network 506, and at 526, the HNB 504 transmits the cell-IDs, including the relevant parameters of one or all of the fallback cells to the UE 502. At 528, the UE 502 stores the list.

Generally, for the preparation phase to be complete, these steps should be performed at least one time, such as the first time that a UE connects to the HNB 504. After this initial phase, a procedure having a reduced number of steps can be applied. In particular, if the same UE connects a second time to the HNB 504, nothing need be done. It is sufficient that the UE uses the stored parameters obtained at the last connection with this HNB 504. If a second UE connects to the HNB 504, it is sufficient to perform only steps 526 and 528, so that the list of stored fallback cells from the HNB 504 is sent to the second UE, and the second UE stores the list. Additionally, in some embodiments, the HNB 504 or operator settings may permit steps 518, 520, and 522 to be skipped, so that the list of stored fallback cells is transmitted to the UE without checking with the core network. In all of these cases, although a reduced number of steps may be performed, it may be useful to perform the complete procedure from time to time to ensure that the stored parameters are up to date.

Figure 5B:
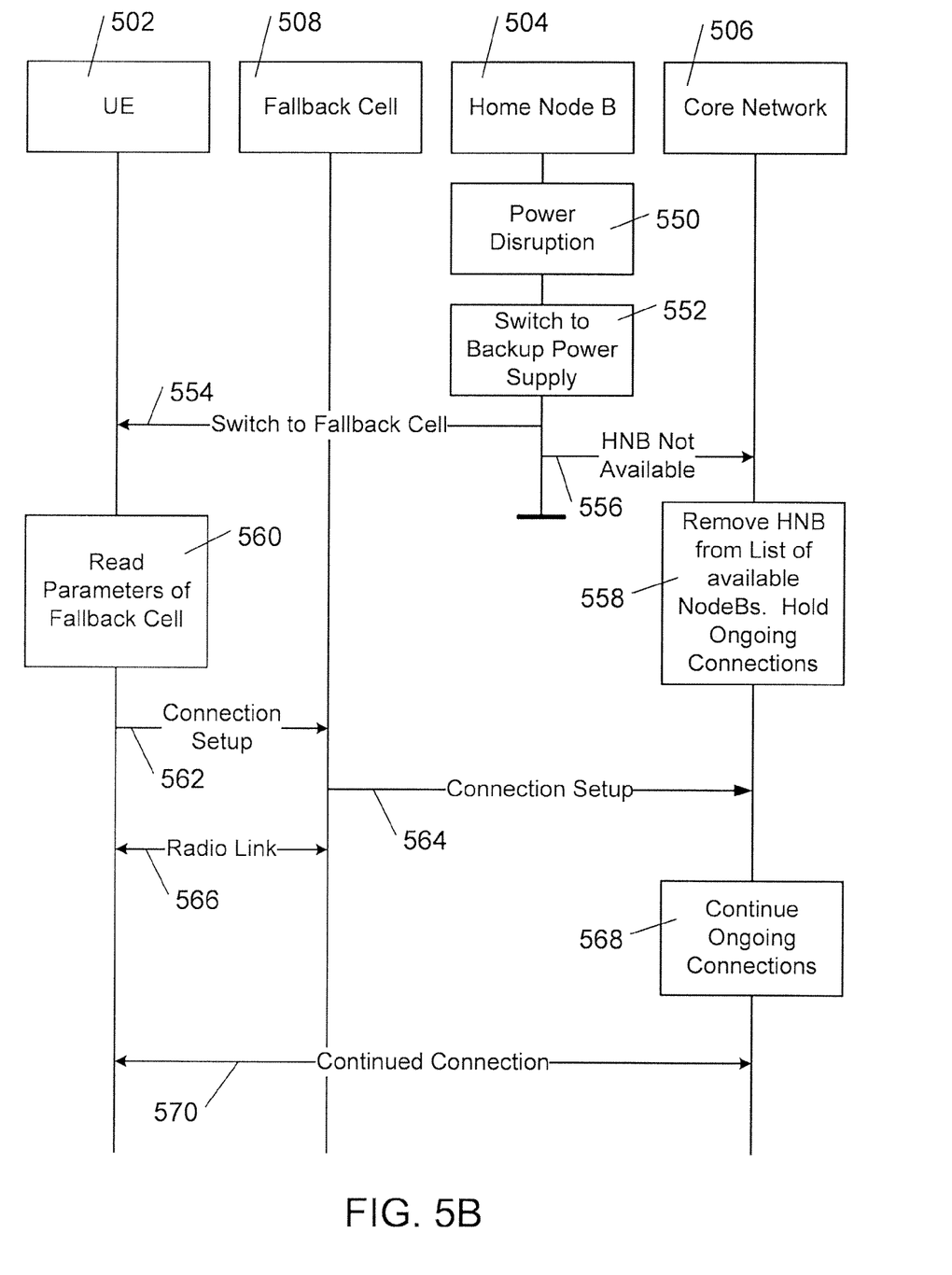

FIG. 5B shows the execution phase corresponding to the preparation phase shown in FIG. 5A, for an embodiment in accordance with the invention.

At 550 a power disruption occurs on the HNB 504. This may occur, for example, when the owner of the HNB 504 unplugs the power cord, the owner switches the HNB 504 off, or due to an unintentional loss of power. At 552, the HNB 504 detects this power disruption, and uses a backup or emergency power supply, such as a battery, to continue operation.

Next, due to the detected power disruption, the HNB 504 transmits two types of messages at 554 and 556. At 554, the HNB 504 transmits the message "switch to fallback cell". This message is transmitted in a broadcast mode, so that all UEs that are camped on the HNB 504 will receive the message. If the transmitter of the HNB 504 is based on E-UTRA, this can be done by transmitting a special RNTI (Radio Network Temporary Identity) value, e.g. including 16 bits, on the DL control channels. This RNTI has the properties that it addresses all UEs in a specific cell (e.g., a cell operated by an HNB) that are camped on this cell, and that reception leads to an initiation of radio link setup to the fallback cell.

At 556, the HNB 504 transmits the message "HNB not available" to the core network 506. Once the "switch to fallback cell" and "HNB not available" messages have been transmitted, the HNB 504 stops transmitting and receiving.

At 558, the core network (e.g., the Mobility Management Entity (MME) in the case of E-UTRA) will delete the HNB 504 from the list of available NodeBs. This has several consequences. For arriving downlink data for a UE that is registered in the same Tracking Area (i.e., a set of radio cells) as the HNB 504, the HNB 504 would not obtain paging information. Additionally, all ongoing connections to and from the HNB 504 will be set on "hold" by the core network 506 (e.g., by the MME), so that the contexts of the sessions are kept, but no data are transmitted.

At 560, after receiving the "switch to fallback cell" message, the UE 502, which is in an ongoing call, stops sending and receiving data from/to the HNB 504 and reads the parameters of the fallback cell from the stored list. If more than one fallback cell is listed, the UE 502 will select one of them based on fallback cell selection criteria, e.g., the strongest received power level, lowest load, or at random.

At 562 the UE 502 will start to establish a connection to the core network 506 via the selected fallback cell 508. The UE 502 will use the stored parameters to transmit a "connection setup" message to the fallback cell 508, e.g. by using random access. The "connection setup" message may include information that an ongoing connection should be continued.

At 564, the fallback cell 508 establishes the connection to the core network 506 and forwards the information that the ongoing connection should be continued.

At 566, a radio link between the UE 502 and the fallback cell 508 is established, and at 568, the core network 506 takes the connection off of "hold", and continues to route data to and from the UE 502. At 570, the connection is continued, and the UE 502 can send and receive data.

The embodiment illustrated in FIGS. 5A and 5B uses less signaling in the execution phase than some other embodiments. This means that an emergency power supply, such as a battery can be smaller in an HNB using this embodiment, since less power is needed after power disruption. Additionally, because this embodiment does not wait for a timer to expire before determining that the HNB has stopped operation, it may have a shorter connection disruption than some embodiments.

Figure 6A:
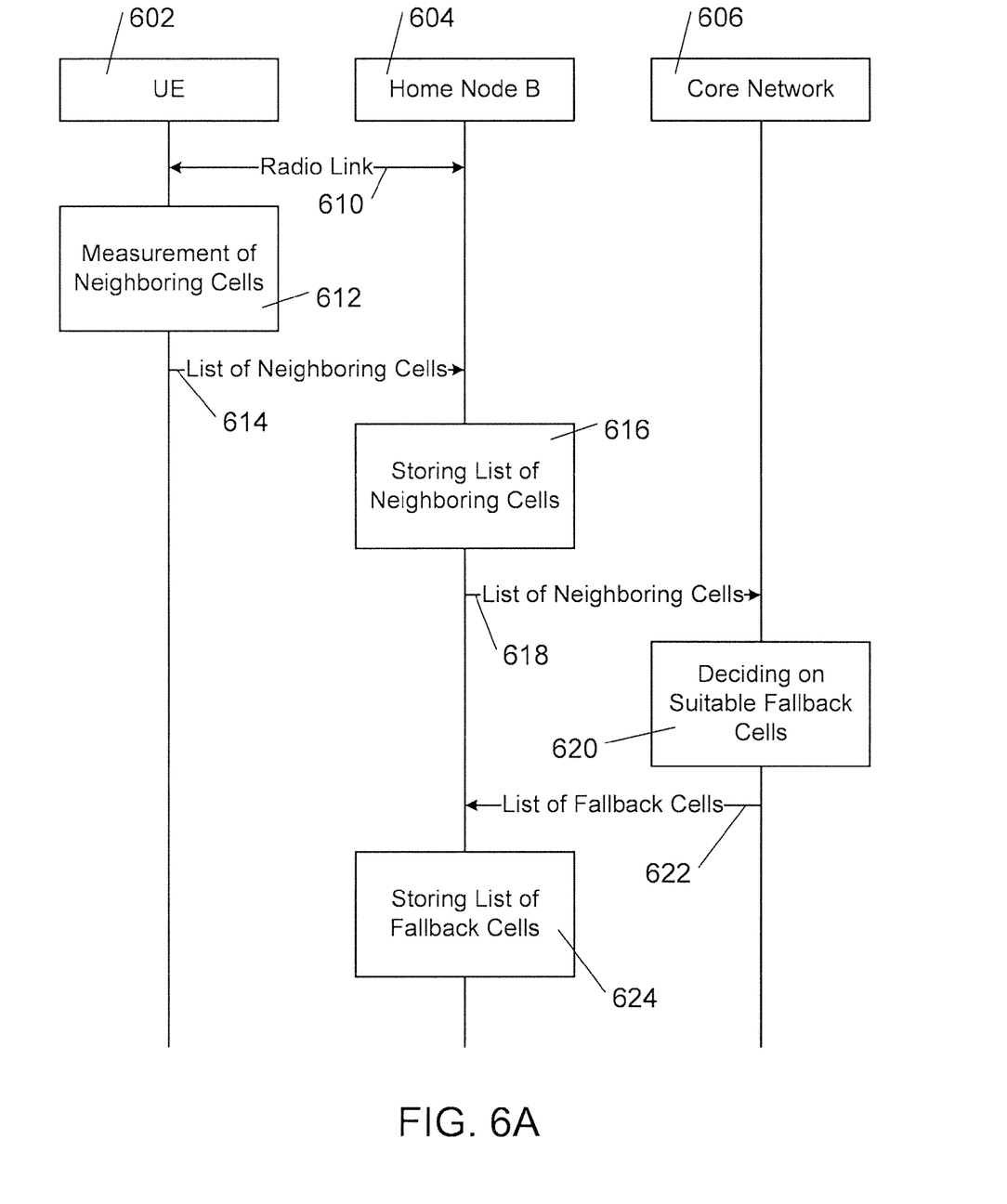
FIGS. 6A and 6B show, respectively, message sequence charts for a preparation phase and an execution phase of another embodiment in accordance with the invention.

FIG. 6A shows a message sequence chart for the preparation phase of another embodiment in accordance with the invention. This embodiment has the feature that there is no additional signaling between the HNB and UE in the preparation phase. This reduces the signaling during the most likely case, in which the HNB operates without a power disruption. Further, the latest network conditions, such as network load, can be considered before the UE establishes a connection to the HNB. As will be seen, the message sequence for the preparation phase of this embodiment is similar to the message sequence for the preparation phase of the embodiment shown in FIG. 5A, but has fewer steps involving communication with the UE. The steps shown in FIG. 6A may be performed for each UE individually, so that a list with parameters of the fallback cells is stored in the HNB for each UE that is currently connected to the HNB.

At 610, a UE 602 has established a radio link to an HNB 604. At 612, the UE 602 performs measurements of the neighboring cells. It measures the received power level and obtains the corresponding cell-ID of one or more adjoining or neighboring cells.

At 614, the UE 602 transmits a list with the cell-IDs and the received power levels to the HNB 604. The HNB 604 stores the list at 616, and at 618, the HNB 604 forwards the list to the core network 606.

At 620, the core network 606 decides, based on the received power levels and on further parameters (e.g., the load condition and capacity of the candidate cells), which of the cells are suitable as fallback cells. At 622 the core network 606 transmits a list with the cell-IDs of the suitable fallback cells to the HNB 604. This list includes relevant parameters that are needed by the UE 602 to establish a radio link to the fallback cells. At 624, the HNB 604 stores the list received from the core network 606.

Figure 6B:
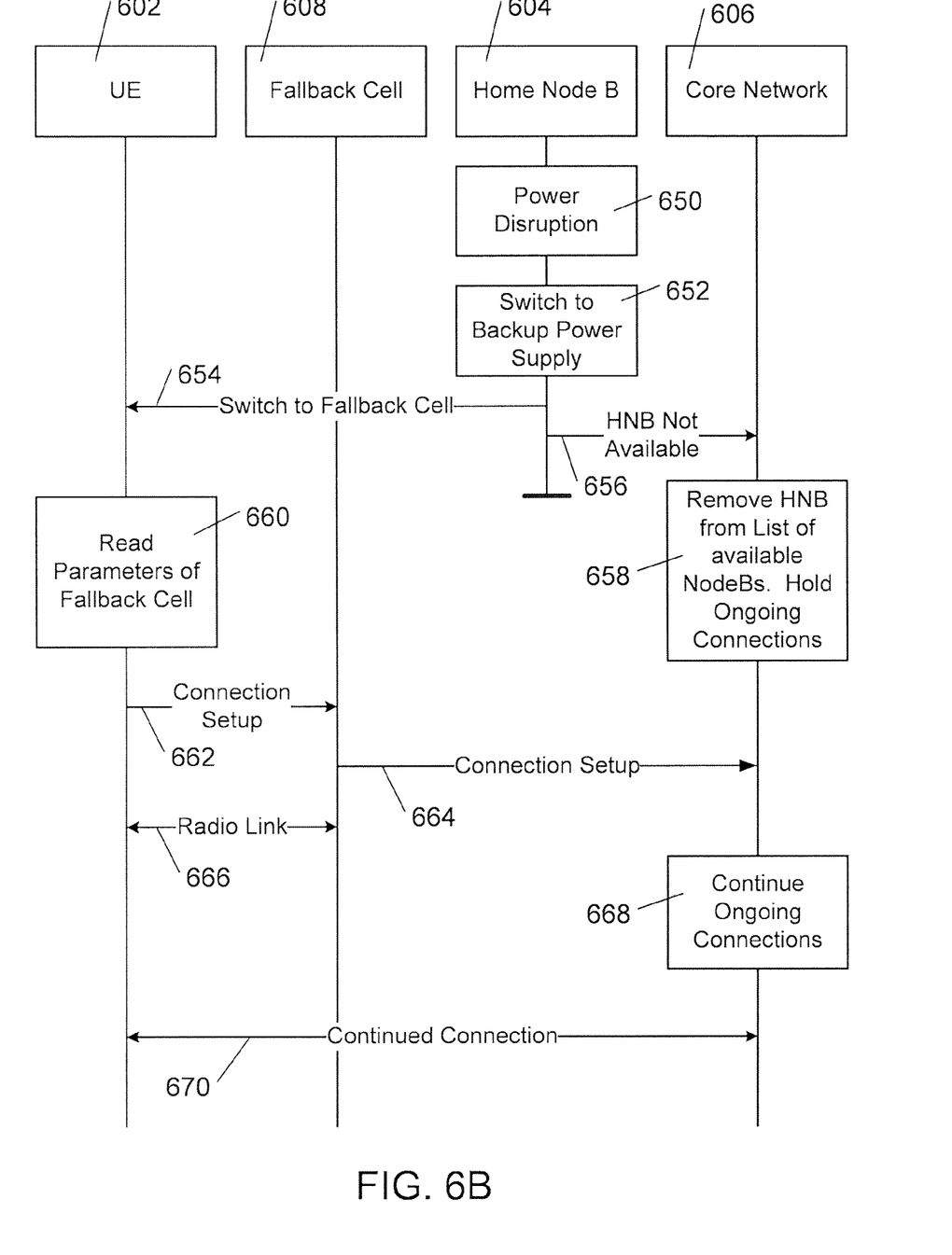

FIG. 6B shows the execution phase of the embodiment for which the preparation phase is shown in FIG. 6A.

At 650 a power disruption occurs on the HNB 604. This may occur, for example, when the owner of the HNB 604 unplugs the power cord, the owner switches the HNB 604 off, or due to an unintentional loss of power. At 652, the HNB 604 detects this power disruption, and uses a backup or emergency power supply, such as a battery, to continue operation.

Next, due to the detected power disruption, the HNB 504 transmits two types of messages at 654 and 656. At 654, the HNB 604 transmits the message "switch to Callback cell". This message is transmitted via broadcast or dedicated connection. Additionally, parameters needed by the UEs to establish a radio link with the fallback cell are transmitted to each connected UE. Each UE may be sent different parameters for different fallback cells.

At 656, the HNB 604 transmits the message "HNB not available" to the core network 606. Once the "switch to fallback cell" and "HNB not available" messages have been transmitted, the HNB 604 stops transmitting and receiving.

At 658, the core network will delete the HNB 604 from the list of available HNBs and/or NodeBs, and set on "hold" all ongoing connections to and from the HNB 604.

At 660, after receiving the "switch to fallback cell" message, the UE 602, which is in an ongoing call, stops sending and receiving data from the HNB 604 and reads the parameters of the fallback cell from the received list. If more than one fallback cell is listed, the UE 602 will select one of them based on fallback cell selection criteria, e.g., the strongest received power level, lowest load, or at random.

At 662 the UE 602 will start to establish a connection to the core network 606 via the selected fallback cell 608. The UE 602 will use the received parameters to transmit a "connection setup" message to the fallback cell 608, e.g. by using random access. The "connection setup" message may include information that an ongoing connection should be continued.

At 664, the fallback cell 608 establishes the connection to the core network 606 and forwards the information that the ongoing connection should be continued.

At 666, a radio link between the UE 602 and the fallback cell 608 is established, and at 668, the core network 606 takes the connection off of "hold", and continues to route data to and from the UE 602. At 670, the connection is continued, and the UE 602 can send and receive data.

Figure 7A:
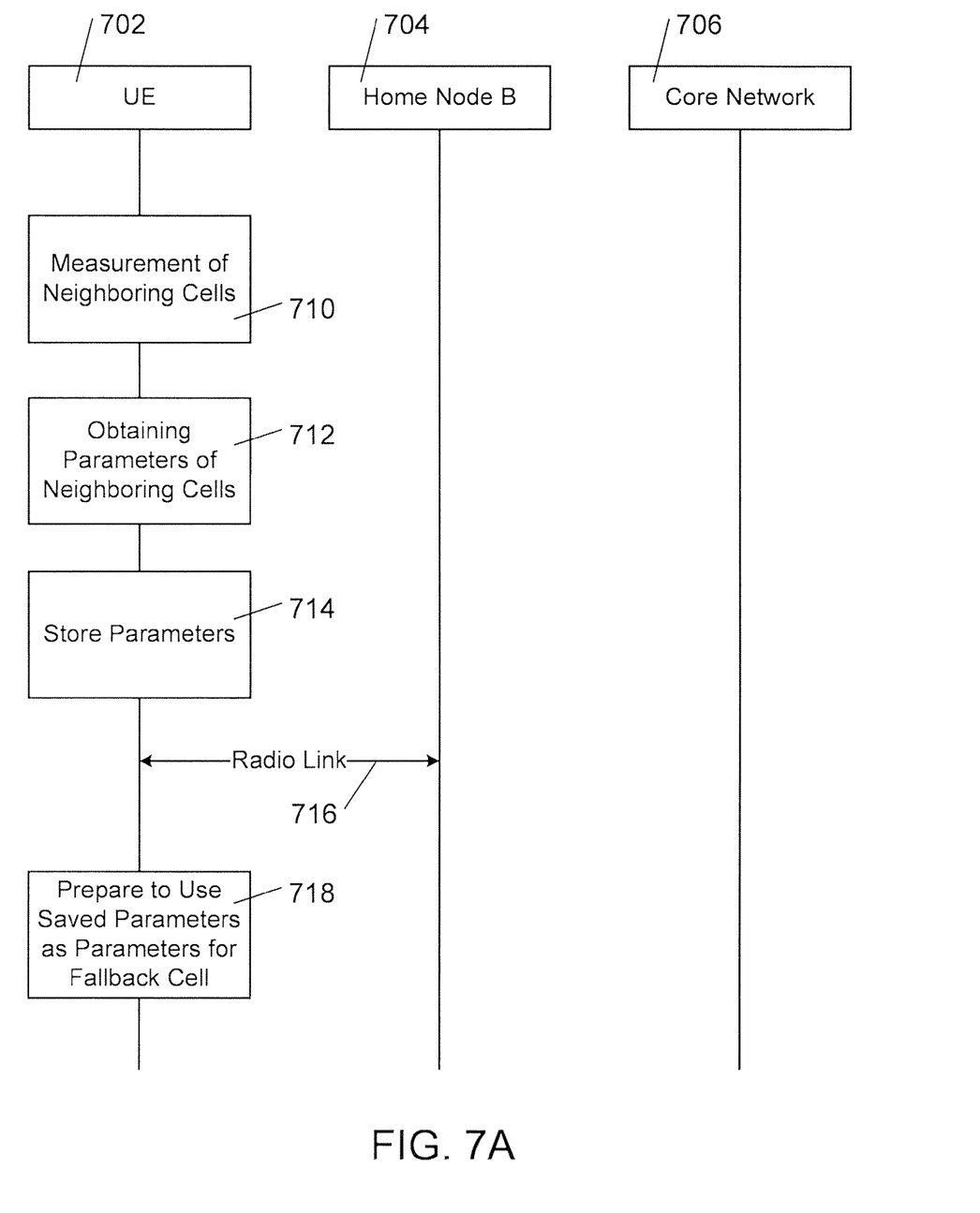
FIGS. 7A and 7B show, respectively, message sequence charts for a preparation phase and an execution phase of a further embodiment in accordance with the invention.
Figure 7B:
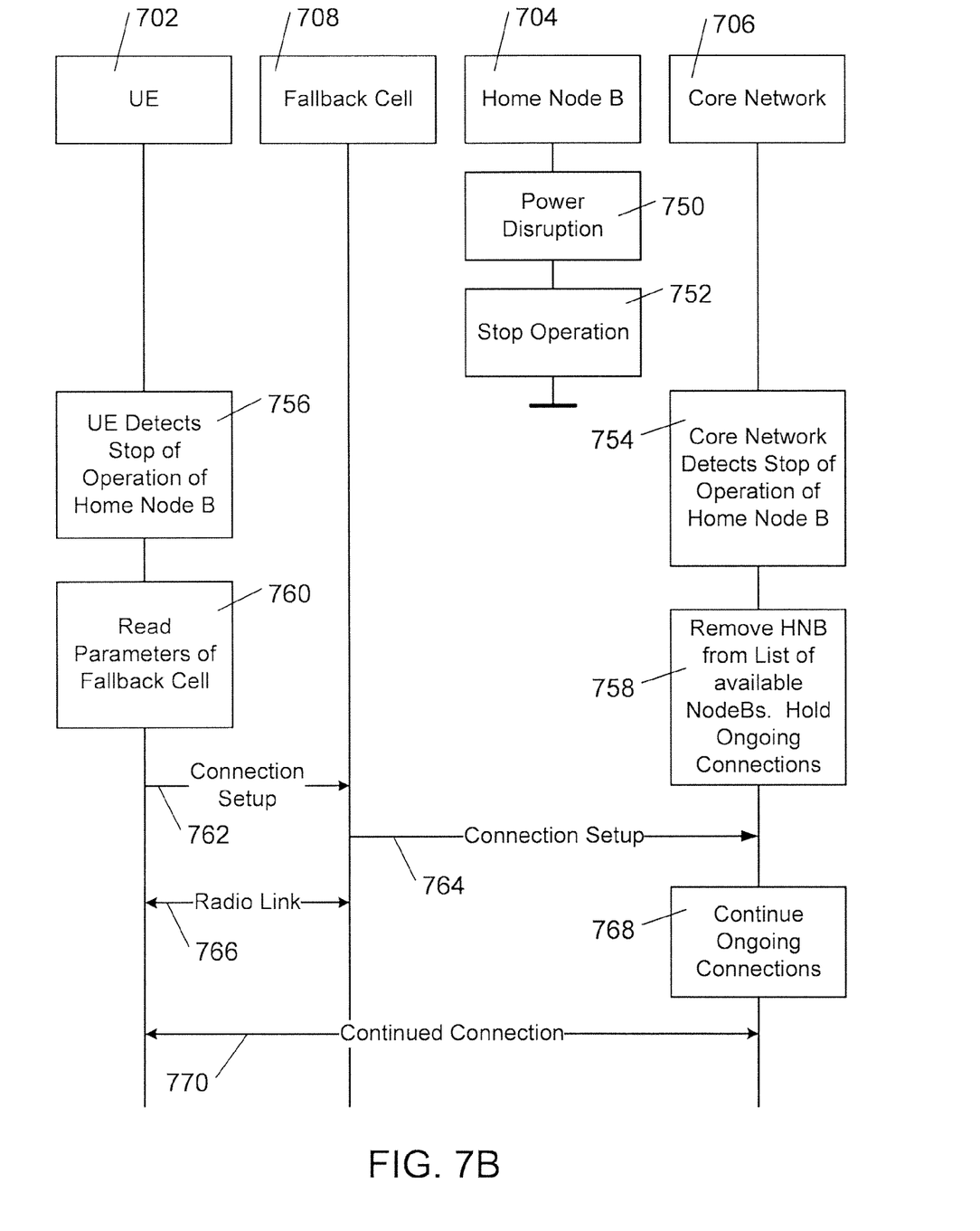

FIGS. 7A and 7B show another embodiment in accordance with the invention, in which no additional features or functionality is required at the HNB. This permits this embodiment to work with "legacy" HNBs (i.e., HNBs that do not use the methods or have the features in accordance with various embodiments of the invention), or with ordinary ("legacy") NodeBs. Further, no additional signaling is needed in the preparation or in the execution phase. Since this embodiment relies on the UE to detect that the HNB has stopped operating, typically via a timeout condition, the duration of an interruption may be longer than with other embodiments.

FIG. 7A shows the preparation phase for this embodiment. At 710, the UE 702 measures neighboring cells. These measurements may be made before the UE establishes a connection with the HNB 704.

At 712, the UE 702 obtains parameters from the neighboring cells to establish a radio link to the neighboring cells. This may also be done before the UE 702 establishes a connection with the HNB 704. If the UE 702 already has established a connection to a neighboring cell, and is performing a handover to the HNB 704, these parameters may already be known by the UE 702, without additional signaling.

At 714, the UE 702 stores the obtained parameters. Depending on the configuration of the UE 702, the UE 702 may store these parameters in a memory (such as the non-volatile memory 270 of FIG. 2B), or in a smart card (such as the smart card 273 of FIG. 2B) associated with the UE 702, such as a SIM card or a UICC with integrated SIM or USIM. In some embodiments, if the parameters are stored in a smart card, the mobile network operator may use a dedicated application in the smart card to monitor and control the measured parameters, to influence the fallback selection criteria according to the mobile network operator's handover policies. In some embodiments, such dedicated applications may be implemented using SAT (SIM Application Toolkit) or USAT (USIM Application Toolkit) methods.

At 716, the UE 702 establishes a radio link to the HNB 704. Once this radio link is established, the UE 702 may send and receive data on the core network 706 via the HNB 704.

At 718, the UE 702 prepares to use saved parameters (e.g., the most recent parameters saved) as parameters for the fallback cell. In some embodiments, this may involve some smart card interaction and/or use of applications in the smart card, as described above in 714.

FIG. 7B shows the execution phase for this embodiment.

At 750, a power disruption occurs on the HNB 704. This may occur, for example, when the owner of the HNB 704 unplugs the power cord, the owner switches the HNB 704 off, or due to an unintentional loss of power. At 752, the HNB 704 stops operation.

At 754, the core network 706 detects the stop of operation of the HNB 704. This may occur, for example, because the HNB 704 did not respond before the expiration of a timer. Similarly, at 756, the UE 702 detects the stop of operation of the HNB 704. Again, this may occur due to a timeout condition, such as a failure of the HNB 702 to answer before the expiration of a timer.

At 758, the core network (e.g., the MME in the case of E-UTRA) will delete the HNB 704 from the list of available HNBs. This means, for example, that for arriving downlink data for a UE that is registered in the same Tracking Area (i.e., a set of radio cells) as the HNB 704, the HNB 704 would not obtain paging information. Additionally, all ongoing connections to and from the HNB 704 will be set on "hold" by the core network 706 (e.g., by the MME), so that the contexts of the sessions are kept, but no data are transmitted.

At 760, after detecting that the HNB 704 has stopped operation, the UE 702, which has an ongoing call, stops sending and receiving data from/to the HNB 704 and reads the parameters of the fallback cell from the stored list. If more than one fallback cell is listed, the 11E 702 will select one of them based on fallback cell selection criteria, e.g. the strongest received power level, lowest load, or at random. As discussed above in the preparation phase, this may involve interaction with a mobile network operator-controlled application residing in a smart card on the UE 702 (possibly by means of SAT or USAT commands), e.g., to apply fallback cell selection criteria according to the mobile network operator's handover policies.

At 762 the UE 702 will start to establish a connection to the core network 706 via the selected fallback cell 708. The UE 702 will use the stored parameters to transmit a "connection setup" message to the fallback cell 708, e.g. by using random access. The "connection setup" message may include information that an ongoing connection should be continued.

At 764, the fallback cell 708 establishes the connection to the core network 706 and forwards the information that the ongoing connection should be continued.

At 766, a radio link between the UE 702 and the fallback cell 708 is established, and at 768, the core network 706 takes the connection off of "hold", and continues to route data to and from the UE 702. At 770, the connection is continued, and the UE 702 can send and receive data.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for a mobile communication device wirelessly connected to a cell operated by a base station to reduce a communication interruption time when the base station stops operation, the method comprising:
   measuring a received power of one or more neighboring cells;
   transmitting the received power measurements of the one or more neighboring cells to the base station;
   receiving, from the base station, an indication of one or more fallback cells, wherein the indication includes a cell identifier for each of the one or more fallback cells;
   receiving, from the base station while the base station is operating on a backup power source and subsequent to the receiving of the indication of the one or more fallback cells, a radio network temporary identity (RNTI) value on a downlink control channel, the RNTI value to inform the mobile communication device that the base station is stopping operation and that the mobile communication device is to switch to a fallback cell of the one or more fallback cells; and
   using a cell identifier of a first fallback cell of the one or more fallback cells to establish a wireless connection to the first fallback cell, said using the cell identifier to include sending a connection setup message to the first fallback cell.

2. The method of claim 1, wherein receiving the indication of the one or more fallback cells further comprises receiving parameters for the one or more fallback cells from the base station.

3. The method of claim 2, further comprising selecting the first fallback cell from among the one or more fallback cells.

4. The method of claim 3, wherein selecting the first fallback cell comprises using an application on a smart card to select the first fallback cell based on fallback selection criteria.

5. A home node B (HNB) comprising:
   a processor to determine that the HNB is stopping operation due to loss of power; and to switch to a backup power source based on said determining that the HNB is stopping operation due to loss of power;
   a radio module to transmit a first message to the mobile communication devices connected to the HNB that they should switch to a fallback cell, since the HNB is stopping operation, wherein the first message includes a radio network temporary identity (RNTI) value; and
   a network interface to transmit a second message to the core network to indicate that the HNB is not available.

6. The HNB of claim 5, wherein the processor is to obtain information on one or more neighboring cells prior to determining that the HNB is stopping operation.

7. The HNB of claim 6, wherein the processor is to obtain information on one or more neighboring cells by being configured to receive measurements of the signal power of the one or more neighboring cells from the one or more mobile communication devices.

8. The HNB of claim 5, wherein the processor is to obtain information on one or more neighboring cells by being configured to make measurements of the signal power of the one or more neighboring cells.

9. The HNB of claim 5, wherein the network interface is to send the information on one or more neighboring cells to the core network.

10. The HNB of claim 9, wherein the network interface is to receive parameters of one or more fallback cells from the core network.

11. The HNB of claim 10, wherein the radio module is to send parameters of at least one of the one or more fallback cells to at least one of the mobile communication devices.

12. The HNB of claim 5, wherein the second message is broadcast to all of the mobile communication devices.

13. The HNB of claim 5, wherein the radio module is to transmit separate first messages to each of the mobile communication devices connected through the base station.

14. The HNB of claim 5, wherein the radio module is to transmit parameters for a mobile communication device to establish a wireless connection to the fallback cell.

15. One or more non-transitory computer-readable media having instructions, which when executed, cause a mobile communication device to:
   measure a received power of one or more neighboring cells;
   transmit the received power measurements of the one or more neighboring cells to the base station;
   receive, from the base station, an indication of one or more fallback cells, wherein the indication includes a cell identifier for each of the one or more fallback cells;
   receive, from the base station while the base station is operating on a backup power source and subsequent to the receiving of the indication of the one or more fallback cells, a radio network temporary identity (RNTI) value on a downlink control channel, the RNTI value to inform the mobile communication device that the base station is stopping operation and that the mobile communication device is to switch to a fallback cell of the one or more fallback cells; and
   use a cell identifier of a first fallback cell of the one or more fallback cells to establish a wireless connection to the first fallback cell, said use of the cell identifier to include send a connection setup message to the first fallback cell.

16. The apparatus of claim 15, wherein the instructions, when executed, further result in the mobile communication device:
   use an application on a smart card to select the first fallback cell based on fallback selection criteria.

17. The one or more non-transitory computer-readable media having instructions, which when executed, cause a home node B (HNB) to:

determine that the HNB is stopping operation due to loss of power;
switch to a backup power source based on said determining that the HNB is stopping operation due to loss of power;
transmit a first message to the mobile communication devices connected to the HNB that they should switch to a fallback cell, since the HNB is stopping operation, wherein the first message is to include a radio network temporary identity (RNTI) value; and
transmit a second message to the core network to indicate that the HNB is not available.

* * * * *